April 6, 1965 H. T. FRIIS 3,177,488

BROAD BAND MICROWAVE RADIO LINK

Filed Dec. 24, 1959

INVENTOR
H. T. FRIIS
BY Ray M. Porter, Jr.
ATTORNEY 3,177,488
Patented Apr. 6, 1965

3,177,488

BROAD BAND MICROWAVE RADIO LINK

Harald T. Friis, Rumson, N.J., assignor to Bell Telephone Laboratories, Incorporated, New York, N.Y., a corporation of New York Filed Dec. 24, 1959, Ser. No. 861,976
5 Claims. (Cl. 343—100)

This invention relates to microwave communications and, more particularly, to a broad band radio link employing a plurality of narrower band microwave relay channels. In one aspect it relates to a broad band radio link for traversing a relatively short distance between sections of a long distance microwave guide communications system.

As the use of public communication facilities between large metropolitan centers continues to increase, the already existing shortage in radio frequency space allotted to common carriers becomes even more critical. Already, microwave relay systems entering the most congested portions of the country have very nearly reached the saturation point.

Experimental systems have been built and tested and definite plans are being made for the next form of long distance communication media comprising a cross-country guided wave system, probably utilizing the circular electric mode of wave propagation in a wave guide of the circular cross-section or in a helical wave guide or in a combination of both. Such a system would have a bandwidth of ten or more times the bandwidth of the most modern coaxial cable system or radio relay system.

An obvious difficulty to extending such a wave guide system across the countryside appears when a terrain obstacle, such as a river, a canyon or the like, is encountered or when property is encountered along an otherwise suitable route over which a right-of-way cannot be economically obtained. The wave guide path must be disrupted. The resulting gap could be bridged by a radio link except for the fact that the bandwidth of energy upon the guide is so broad that sufficient frequency spectrum is not available in the common carrier bands to accept it. Parallel radio paths at the same frequency would have an intolerable amount of cross-talk.

It is, therefore, one object of the present invention to reduce frequency bandwidth required for broad band microwave radio communication by utilizing antenna directivity.

It is another object of the present invention to bridge discontinuous sections of a broad band, long distance wave guide without utilizing an undue amount of frequency bandwidth.

It is a further object to utilize antenna directivity to minimize cross-talk between a plurality of short distance, narrow band radio channels used to connect sections of a long distance, broad band wave guide.

In accordance with the present invention, the broad band signal of the wave guide is divided into a plurality of narrow band channels occupying the same common carrier frequency band. A plurality of these narrow channels are transmitted from each of a plurality of antenna locations to a second plurality of antenna locations. The several signals from each location are radiated in directions displaced from each other by acute angles so selected to minimize cross-talk between them.

One feature of the invention resides in the use of a plurality of radio links of the type described connected in cascade to cover longer distances.

These and other objects, the particular features and advantages of the invention will be more apparent upon consideration of the following detailed description taken in connection with the drawings, in which.

Figures 1, 2, 3:
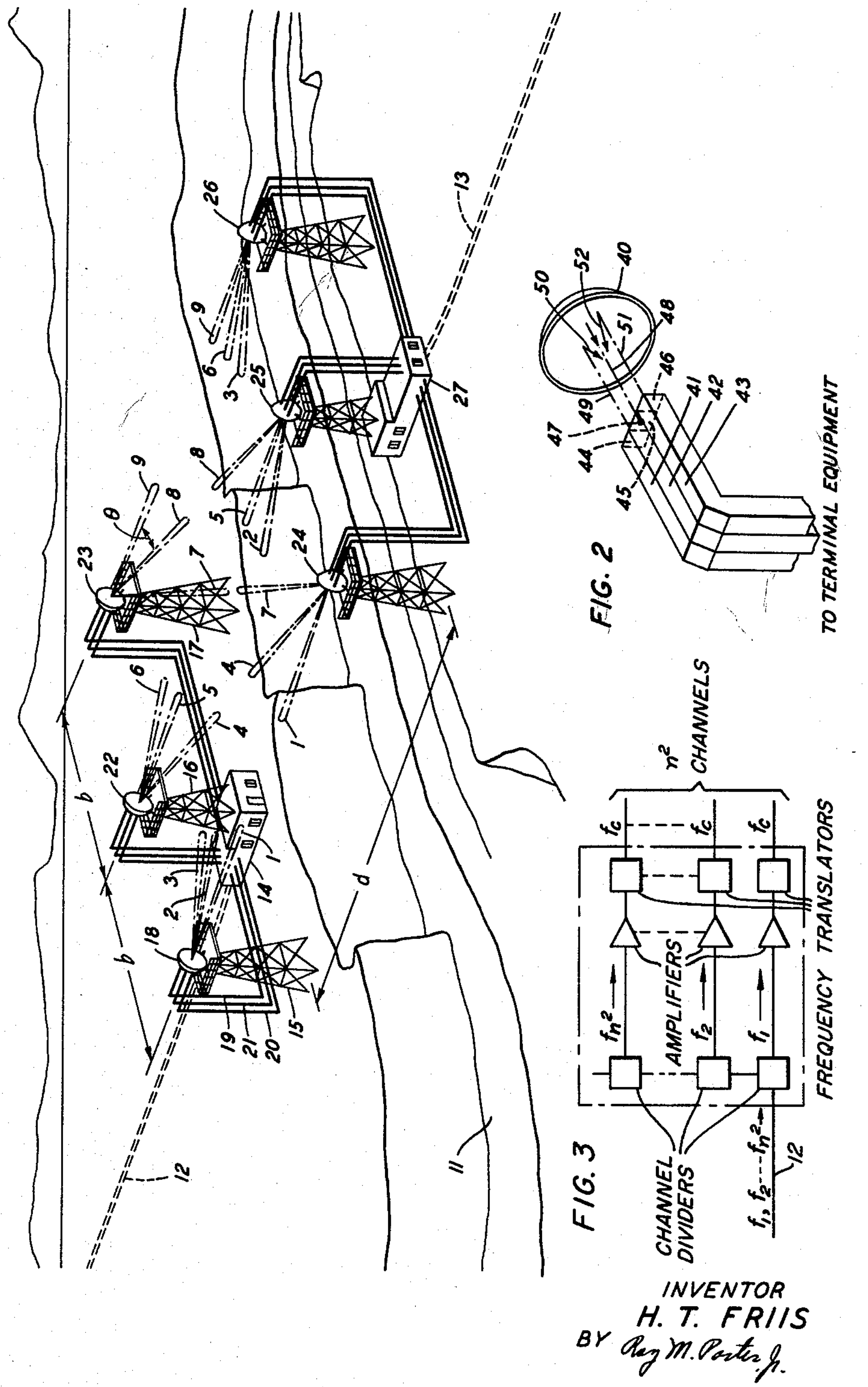
FIG. 1 is a panoramic view of a wave guide system and radio link in accordance with the invention.
FIG. 2 is a detail of a typical multilobe antenna for use with the present invention.
FIG. 3 is a detail of a terminal station of FIG. 1.

In FIG. 1 a landscape is shown across which extends a terrain obstacle 11 comprising a river, a canyon or both. A long distance, cross-country wave guide 12 approaches the obstacle from one direction along a relatively straight path and a similar guide 13 approaches it from the other. Guide 12 ends in a terminal building, shed or equipment room 14 the contents of which are schematically represented in FIG. 3 in which are located repeater amplifiers, power supplies and the like. Included also is conventional means for dividing the broad band signal $f_1, f_2 \ldots f_n^2$ upon guide 12 into a plurality $n^2$ of narrower band channels $f_1$, $f_2$ and $f_n^2$ and for translating the frequency of each into the same common carrier band $f_c$. In the particular embodiment illustrated in FIG. 1, nine such channels are illustrated each contemplated as having a one thousand megacycle bandwith and each being translated so that it occupies the common carrier band of 10.7 to 11.7 kilomegacycles.

Disposed along one edge of obstacle 11 are a plurality of antenna locations 15, 16 and 17 displaced from each other by a distance *b* which will be considerably less than the distance *d* across obstacle 11. The approximate relationship between *b* and *d* will be set out hereinafter. If the band of guide 12 is divided into $n^2$ channels, *n* antenna locations must be provided. Provided at each antenna location are means for radiating *n* separate radio beams each having a thousand magacycle bandwidth and a relatively narrow beam width. In accordance with a particular feature of the invention, a single antenna, such as 18, having *n* separate feeds and radiating *n* lobes, such as 1, 2 and 3, is employed at each location. A suitable antenna of this type will be described hereinafter in connection with FIG. 2. Separate wave guide paths 19, 20 and 21 connect each feed of antenna 18 to the channel branching and frequency translating equipment in terminal 14. A similar antenna 22 radiating lobes 4, 5 and 6 is located at 16 and an antenna 23 radiating lobes 7, 8 and 9 is located at 17.

Across obstacle 11 from locations 15, 16 and 17 and antennas 18, 22 and 23 are three further similarly spaced, antenna locations having multilobe antennas 24, 25 and 26, respectively, so placed that one lobe of each is directed to receive a lobe from each of the antennas of the first group. On FIG. 1 the correspondence of antenna lobes has been indicated by using corresponding reference numerals on the lobes of both antenna groups to indicate those associated with each other. Thus, lobe 1 of antenna 18 is received upon lobe 1 of antenna 24, lobe 2 upon lobe 2 of antenna 25 and lobe 3 upon lobe 3 of antenna 26, et cetera. Similar lobes 4, 5 and 6 of antenna 22 and lobes 7, 8 and 9 of antenna 23 are received, respectively, at antennas 24, 25 and 26. The several narrow band (1000 megacycle) channels representing the energy comprising the separate lobes received at antennas 24, 25 and 26 are carried by separate feed wave guides to terminal building 27 where they are translated in frequency as required and recombined for further transmission as a broad band signal upon guide 13.

While the several lobes may each comprise signals at the same frequency, a desired minimum of interference or cross-talk is maintained by directional selectivity. Maximum discrimination between adjacent major lobes, such as lobes 8 and 9 of antenna 23, occurs if the angle $\theta$ between these lobes is such that the major lobe of one falls upon the null between the major lobe and the first minor side lobe of the other. As is well known from standard antenna design calculations the angle expressed in radians from the center of the major lobe to the center of this null is approximately given by $\lambda/\alpha$ where $\lambda$ is the wavelength and $\alpha$ is the antenna aperture width in the plane of interest. Therefore $\theta$ between the two major lobes 8 and 9 should be approximately equal to $\lambda/\alpha$. Since $$\theta=\frac{d}{d}$$

where $b$ is the distance between adjacent antenna locations and $d$ is the distance across the obstacle, the distance $b$ is then equal to $\lambda d/\alpha$. If more than two antennas (or two major lobes) are employed at a single location, it will not be possible for every major lobe to fall upon a null in the pattern of every other antenna at that location. The above defined conditions, therefore represent the minimum angle and the minimum spacing between adjacent locations. Thus, in a typical embodiment operating with an antenna having an aperture width of three meters, a wavelength of 0.03 meter, and transmitting over a distance of about two miles or thirty-two hundred meters, the distance $b$ between adjacent antenna locations should be thirty-two meters or about one hundred feet. Reducing the distance $d$ will proportionately reduce the distance $b$.

Obviously narrow beam antennas with low minor side lobes are preferred for practicing this invention. The beam width is narrowed by increasing the size of the antenna. Reduction of minor side lobes is accomplished by designs familiar to the art. If in a particular embodiment minor side lobes have been reduced to a point at which they are no longer of major concern, the distance $b$ may be increased from the minimum set out above, always, however, remaining within the limit that it is small compared with the distance $d$.

An embodiment of a typical multilobe, multifeed antenna is shown in FIG. 2 which may be used for any of the antennas of FIG. 1. The particular antenna of FIG. 2 is of the general type disclosed by A. C. Beck in Patents 2,409,183 granted October 15, 1946, and 2,495,-219, granted January 24, 1950, and is shown here merely for illustration since many other suitable types of multilobe, multifeed antennas are known to the art. Thus, as shown in FIG. 2, the feed portion of the antenna comprises three parallel conductively bounded wave guides 41, 42 and 43 which may have contiguous narrow walls and suitably formed ninety degree bends to connect the lower end of each guide to the terminal equipment. The other end of each guide is open to electromagnetic wave energy thereby constituting radiating apertures 44, 45 and 46, respectively. Facing these apertures is a conductive parabolic reflector 40 which is particularly illustrated as a concave paraboloidal mirror, but which may be a cylindrical parabolic reflector or a sectorial parabolic reflector. In either event, the focal point 47 of reflector 40 is located in the plane of aperture 45 and substantially at the center thereof so that the main optical axis 48 of reflector 40 coincides with the longitudinal axis of guide 42. In practice the size of reflector 40 will be somewhat larger in proportion to guides 41, 42 and 43 than would appear from the illustrative drawing. Apertures 44 and 46 are therefore disposed on either side of axis 48.

Vertically polarized energy fed by guide 42 will be centered about focal point 47 of reflector 40 and a major lobe will be reflected by the surface of the reflector comprising components traveling substantially parallel to axis 48. Energy fed by guide 41 from aperture 44 follows a path such as represented by line 49 to the left of focal point 47 and is therefore reflected by reflector 40 at an acute angle to the axis 48 into a major lobe having its maximum intensity to the right of axis 48 as represented by vector 50. Similarly, energy in guide 43 will follow line 51 to be redirected in a major lobe as represented by vector 52. Thus, the combination of FIG. 2 radiates three separate major lobes of wave energy having angles between them determined by the transverse spacing of the feeds from the optical axis of the reflector.

While the preferred embodiment of the invention has been described in terms of a single antenna having multiple lobes, it is apparent that the broader principles thereof may be applied to separate antenna radiating elements, compactly grouped at each antenna location. Furthermore, while only a single polarity of radiating energy has been discussed, it is apparent that the capacity of the link may be doubled by using cross-polarized radiation as is common in many microwave relay systems. Alternatively, one polarization may be used for transmission in one direction and the other polarization for transmission in the opposite direction. Finally, while the principal novelty of the invention is visualized in terms of a single link as described, it should be noted that a plurality of links in accordance with the invention could be connected in cascade to cover a longer distance before the intelligence is returned to the cross-country wave guide. Furthermore, many links of the type described could be connected in cascade to extend between a transmitting location and a receiving location without resort to the cross-country wave guide. In such an application, a typical embodiment could employ antennas of six meter aperture width spaced forty-eight meters or one hundred sixty feet between adjacent locations to cover a transmission distance of nine thousand six hundred meters or about six miles.

In all cases, it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A radio transmission system for a wide band electromagnetic intelligence signal comprising, means for dividing said wide band into $n^2$ narrower band channels each representing different portions of said intelligence signal, said factor $n$ being an integer greater than unity, means for transposing all of said channels into the same frequency band, a first group of $n$ antenna locations and a second group of $n$ antenna locations, said groups being spaced from each other by a given distance and the locoations within each group being spaced from each other by a distance that is small compared to said given distance, means for coupling $n$ of said $n^2$ channels to each of said $n$ locations of said first group, means at each of said locations of said first group for radiating $n$ of said channels representing different intelligence in directions displaced from each other by acute angles with at least a portion of the signals radiated from any location in said first group crossing in the space between said first and second groups with at least a portion of the signals radiated from another of said locations in said first group, and means at each of the locations of said second group for collecting $n$ of said radiated signals.

2. The radio system according to claim 1 wherein each of said antenna locations includes a single antenna reflector having $n$ separate feeds and $n$ separate radiation lobes.

3. The combination according to claim 2 wherein the plurality of radiation lobes of any one of said antennas have acute angles therebetween and wherein the spacing between the antennas of said first plurality is no less than $\lambda d/\alpha$ where $\alpha$ is the aperture width of said one antenna and $d$ is the distance between said first and second plurality.

4. The radio system according to claim 1 wherein a cross country section of a conductively bounded wide band electromagnetic wave guide is included on at least one side thereof.

5. A transmission system according to claim 1 including means at each of said second plurality of locations for re-radiating the $n$ signals collected at that location in directions displaced by acute angles from each other, and a third plurality of $n$ locations spaced from each other and away from said second plurality, and means for collecting $n$ of said radiated signals at each of said third locations.

References Cited by the Examiner

UNITED STATES PATENTS

| | | | |
|---|---|---|---|
| 2,000,130 | 5/35 | Espenchied et al. | 325—3 |
| 2,401,333 | 6/46 | Bumstead | 325—14 |
| 2,425,066 | 8/47 | Labin et al. | 179—15 |

| | | | |
|---|---|---|---|
| 2,500,090 | 3/50 | Oman | 325—146 |
| 2,530,826 | 11/50 | Kock | 325—14 |
| 2,563,990 | 8/51 | Cutler | 343—779 |
| 2,579,882 | 12/51 | Thompson | 343—200 |
| 2,668,907 | 2/54 | Evans | 325—14 |
| 2,985,875 | 5/61 | Grisdale et al. | 343—100 |

CHESTER L. JUSTUS, *Primary Examiner.*